United States Patent [19]

Maier

[11] 4,297,692
[45] Oct. 27, 1981

[54] SEGMENT FAILURE DETECTOR FOR DIGITAL DISPLAY

[75] Inventor: Lawrence C. Maier, Middlebury, Vt.

[73] Assignee: Simmonds Precision Products, Inc., Tarrytown, N.Y.

[21] Appl. No.: 138,474

[22] Filed: Apr. 8, 1980

Related U.S. Application Data

[63] Continuation of Ser. No. 18,209, Mar. 7, 1979, abandoned.

[51] Int. Cl.³ .......................... G06F 3/14; G09F 9/32
[52] U.S. Cl. .................................. 340/715; 340/641; 340/756
[58] Field of Search ............... 340/715, 641, 642, 643, 340/652, 654, 657, 756

[56] References Cited

U.S. PATENT DOCUMENTS

| | | | |
|---|---|---|---|
| 3,548,403 | 12/1970 | Johnson | 340/715 |
| 3,696,390 | 10/1972 | Cohen | 340/715 |
| 3,719,937 | 3/1973 | Doyle | 340/642 |
| 3,753,226 | 8/1973 | Schnurmann et al. | 340/715 |
| 3,866,171 | 2/1975 | Loshbough | 340/715 |
| 4,001,808 | 1/1977 | Ebihara | 340/715 |

Primary Examiner—Marshall M. Curtis
Attorney, Agent, or Firm—Edwin E. Greigg

[57] ABSTRACT

A circuit for detecting failure of a segment in a digital display which includes a comparator connected to the energizing circuit for the display segments so that when a segment fails and is addressed, the comparator output is changed to provide a blanking signal which is fed by a circuit to the blanking input of the display driver for blanking the display. The energizing circuit for the display includes lamp test means, which, after display blanking, is actuated to energize all of the segments thereby permitting identification of the failed segment. Release of the lamp test means activates a timer circuit for providing an override signal for overriding the blanking signal to return the display to normal operation for a predetermined period of time following which the display will be blanked again when the failed segment is again addressed.

7 Claims, 1 Drawing Figure

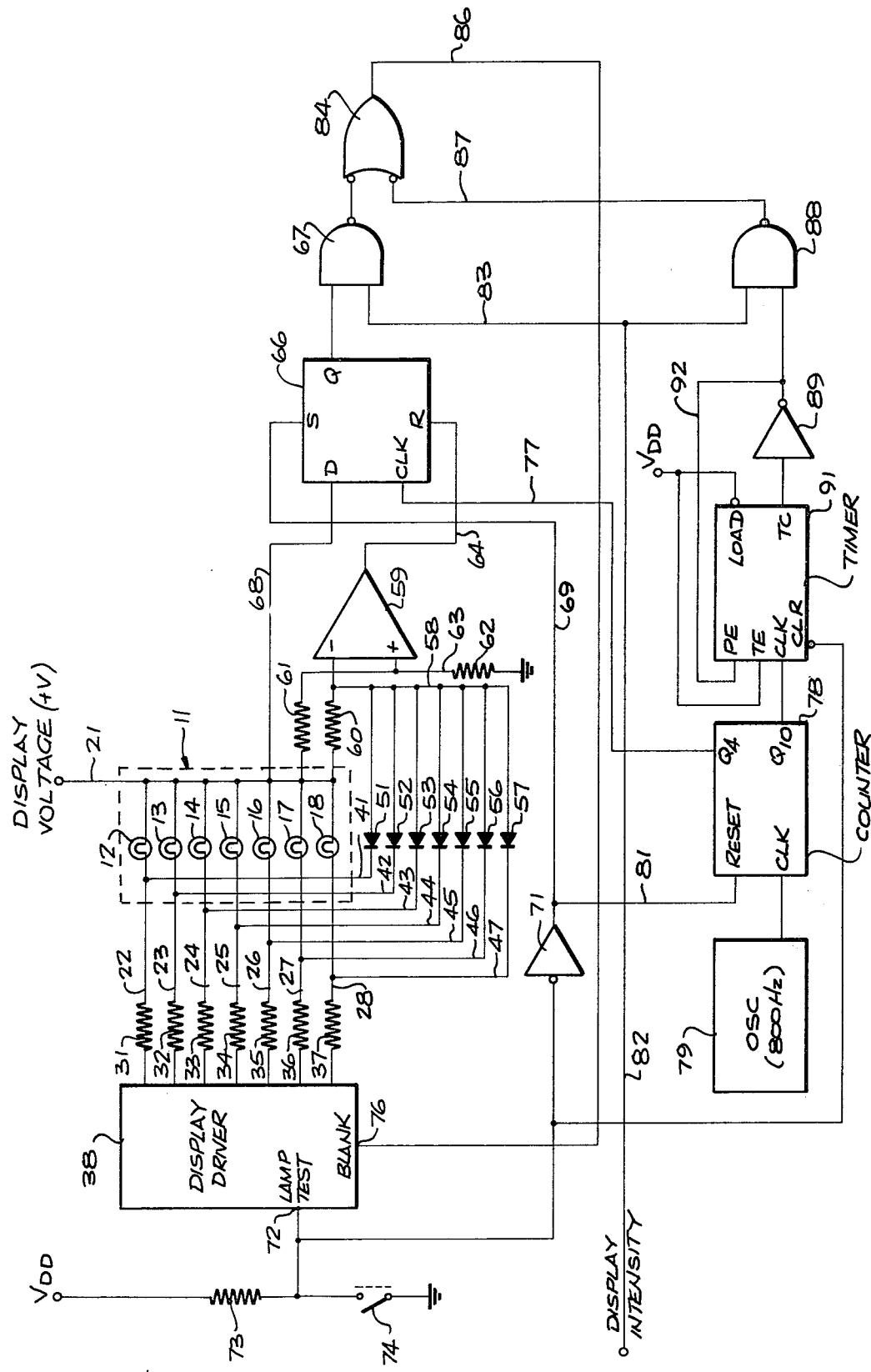

SEGMENT FAILURE DETECTOR FOR DIGITAL DISPLAY

This is a continuation of application Ser. No. 18,209, filed Mar. 7, 1979, now abandoned.

BACKGROUND OF THE INVENTION

Digital circuitry is in widespread use today in many areas such as calculators, counters, electronic watches and many other measurement devices so that many of such devices include digital displays involving integrated circuit techniques. The most common type of such digital displays utilizes seven-segment readout devices for digital numeric indicators. As is well known, by illuminating various combinations of the seven segments, the numbers zero through nine may be formed. Such electrically energizable seven-segment displays may be of any type such as light-emitting diodes, gas discharge tubes, or electroluminescence, etc., the light-emitting diode and incandescent lamp segment being the most common type of digital display in use today.

While such seven-segment displays are extremely reliable, on occasion, one of such segments in an indicator or display may fail as the result of an open circuit or the like. When a segment fails in a display, and is addressed, the failure of the segment to be illuminated results in the indication of an erroneous number. For instance, if the center segment in a seven-segment display burns out, the driving signal to the display for producing the digital display of the numeral "8" becomes a "0" producing an incorrect reading.

In an attempt to alleviate such erroneous readings when a segment fails, one approach has been to generate a blanking signal upon the failure of a segment which is addressed, which signal causes the digital display to go blank thereby indicating that there is a failed segment in the display. However, such a blanking arrangement, while indicating an error, gives no indication of the numeric information which was to be displayed, resulting in a loss of the correct numeric data. Furthermore, to avoid further erroneous readouts, there is no alternative but to discontinue the operation of the display until it can be repaired or replaced.

OBJECTS AND SUMMARY OF THE INVENTION

Accordingly, a primary object of this invention is to provide a new and novel detector for detecting a failed segment in a seven-segment digital display.

Another object of this invention is to provide a new and novel segment failure detector for digital display in which not only is the display blanked to prevent further erroneous readouts upon segment failure, but includes an arrangement for retrieving the information intended to be portrayed in the absence of a failed segment.

Still another object of this invention is to provide a new and novel segment failure detector for a digital display which utilizes circuitry requiring a minimum of component parts so as to be of extremely low cost and which is far less complex and expensive than present-day circuitry utilized for segment failure detection.

Still another object of this invention is to provide a new and novel segment failure detector for a digital display, utilizing light-emitting diodes or incandescent lamps for the segments which provides a simple and easy means to identify a failed segment and to easily retrieve the correct data after a display segment failure.

The object of this invention and other rated objects are accomplished by the provision of at least one display device having a plurality of electrically energized character-forming segments with means for selectively energizing the segments to define predetermined numeric characters. Means are provided for generating a display-blanking signal upon the failure of one of the segments in the display when the one segment is addressed, which display-blanking signal is fed by circuit means to the segment-energizing means for blanking the display. Means are provided for selectively energizing all of the segments for identification of the failed segment, thereby permitting retrieval of the data which was erroneously displayed due to the failed segment, together with means for overriding the blanking signal for a predetermined period of time during which normal operation of the display device occurs following which subsequent addressing of the failed segment again produces a blanking signal for blanking the digital display.

BRIEF DESCRIPTION OF THE DRAWING

The invention will be better understood as well as further objects and advantages thereof will become more apparent from the ensuing detailed description of a preferred embodiment taken in conjunction with the drawing wherein:

The single FIGURE of the drawing is a detailed schematic block diagram of a circuit according to the present invention for detecting a failed segment in a display comprising a seven-segment indicator.

DESCRIPTION OF THE PREFERRED EMBODIMENT

Referring now to the drawing, there is shown within the broken lines a seven-segment indicator of conventional construction and identified by the numeral 11. The digital display or indicator 11 includes seven segments, 12 through 18, arranged in a conventional manner for a numeric display of the numbers 0-9. As is well-known, one side of each of the segments 12-18 are connected by means of conductor 21 to a positive display voltage source and the other side of the segments 12-18 are connected by means of conductors 22 through 28 and resistors 31 through 37, respectively, to a display driver 38 of conventional construction for selectively energizing each of the segments 12-18 for illumination of the individual segments in the well-known manner for displaying the selected numeral 0-9.

As specifically illustrative of the invention, the display segment/resistor junction associated with each of the segments 12-18 is connected by means of conductors 41-47 to the cathodes of diode 51-57, respectively, the anodes of which are tied together by means of conductor 58 connected to the inverting input of a comparator 59 such as a differential amplifier. The inverting input of the comparator 59 is also connected through resistor 60 to the positive display voltage supply through conductor 21. Conductor 21 is also connected through resistors 61, 62 to ground by means of conductor 63 also connected to the non-inverting input of the comparator 59.

The output of comparator 59 is connected by means of conductor 64 to the reset terminal of a D-type flip/flop 66, the Q output of which is connected to one input of a NAND gate 67. The D input of the flip/flop 66 is connected by means of conductor 68 to conductor 21 through which is supplied the positive display voltage and the set input of flip/flop 66 is connected by means of conductor 69 through inverter 71 to a lamp test terminal 72 on the driver 38, the lamp test terminal 72 also being connected through resistor 73 to voltage source Vdd.

The display driver lamp test terminal 72 is also arranged to be connected through a normally open manually operable switch 74 to ground. The display driver 38 also includes a blanking terminal 76 to which a blanking signal is supplied, as will be seen hereinafter to blank the numeric display on the digital display or indicator 11. The clock input on the flip/flop 66 is connected by means of conductor 77 to the $Q_4$ input of a counter 78, the clock input of which being connected to the output of clock 79, preferably an 800 Hz clock, through which is obtained the timing for all of the display functions of the invention. The counter 78 is preferably a divide-by-sixteen and a divide-by-one thousand twenty four counter to provide a lower frequency at its output $Q_{10}$ and its reset terminal is connected by means of conductor 81 to conductor 69 at the output of the inverter 71.

The circuit includes a conductor 82 connected to a voltage control source (not shown) by means of which the display intensity is regulated, conductor 82 being connected by means of conductor 83 to the other input of the NAND gate 67. The output of the NAND-gate 67 is connected to one inverted input of an OR gate 84, the output of which is connected by means of conductor 86 to the blanking terminal 76 on the display driver 38. The other inverted input of the OR gate 84 is connected by means of conductor 87 to the output of a NAND gate 88, having one input connected to conductor 83 and therefore to display intensity conductor 82. The other input of the NAND gate 88 is connected to the output of an inverter 89 and to the PE input of a counter or timer 91 by means of conductor 92. The load and TE terminals of timer 91 are connected to a voltage source Vdd and the terminal count terminal TC of timer 91 is connected to the input of inverter 89. The clock input of timer 91 is connected to the $Q_{10}$ (divide by one thousand twenty four) output of counter 78 and the inverted clear input of timer 91 is connected by means of conductor 93 to conductor 69 between the inverter 71 and the lamp test terminal 72 of the display driver 38.

In the operation of the invention, each of the segments 12–18 forms a series circuit from the supply voltage on conductor 21 through the display segments, resistors 31–37, respectively, (each of the resistors being of a relatively low value such as 10 ohms or the like) to ground through the display driver 38. If a segment is off, it presents a high to the input of the comparator 59. If a segment is on and conducting properly, the IR drop across the series resistor (31–37) associated with the respective segment also presents a high to the comparator input. A failed segment which is off also presents a high to the comparator input. All of these high inputs to the comparator 59 produce a low output from the comparator, indicating normal operation. However, any failed segment which is addressed or turned on, has no current flow to the associated series resistor, no IR drop, and thus presents a low input to the comparator 59. Such a low input to the comparator 59 changes the comparator output which goes high, thereby providing a blanking signal, it being understood that the comparator output only changes if a display segment opens and that open segment is addressed.

In normal operation, with no failed segments, the low output from the comparator 59 is fed to the reset terminal of the D-type flip/flop 66 so that the combination of clock pulses on conductor 77 and high logic level on conductor 68 cause the Q output to be high which, together with the high on the other input of the NAND gate 67 from the display intensity conductor 82 produces a low output from the NAND gate 67 which is fed to one of the inverted inputs of the OR gate 84. At this time, the output of the NAND gate 88 is high as a result of a low input from timer 91 through inverter 89 to one of the inputs of the NAND gate 88. Therefore, the output of OR gate 84 is a high, this high output being applied to the blanking terminal 76 of the display driver 38 which does not interfere with the normal operation of the digital display 11. When a segment fails and is addressed, the output of comparator 59 goes high and the D-type flip/flop 66 stores this blanking signal and as the Q output of flip/flop 66 goes low, the output of NAND gate 67 goes high with the output of OR gate 84 going low, applying a low signal to blanking terminal 76 on the display driver 38 blanking the display 11.

At this time, the lamp test switch 74 is moved into the closed position, applying a low to the display driver 38 to energize all the segments 12–18 for illuminating all of the segments. At the same time, this lamp test signal through conductors 69, 81 and 93 resets the display timers 78 and 91 and clears the blanking flip/flop 66. Upon resetting of timer 91, the TC terminal goes low, so that a high is applied to the input to NAND gate 88 from inverter 89, the NAND gate 88 outputting a low, thereby overriding the blanking signal as the output of OR gate 84 returns to a high, allowing the lamp test to be viewed.

At this time, the operator is able to identify which segment is not operating, thereby inserting the appropriate line in the data displayed prior to blanking and retrieving the correct data.

Upon release of the lamp test switch 74, the display 11 returns to normal operation for a pre-determined period of time (approximately 10 seconds) when the timer 91 latches, after the period of delay or predetermined count in timer 91, is reached and the output of NAND gate 88 once again goes high.

If, after release of the lamp test switch 74, a segment is still failed and being addressed, a blanking signal is stored in the blanking flip/flop 66, as explained above, but the blanking is overridden by the override circuit comprising display timers 78, 91, and gates 84, 88 so that a normal display with a failed segment is viewable. At the end of the timing period, timer 91 removes the blanking override signal from OR gate 84 and if a blanking signal is stored in flip/flop 66, the display 11 will now return to a blank condition.

Periodically, display timer 78 sets the blanking flip/flop 66 and if no failed segment is being addressed, flip/flop 66 remains in the set condition allowing normal display operation. Upon addressing a failed segment, the comparator 59 resets the flip/flop 66 as explained above, and the display 11 is again returned and maintained in the blank condition.

What is claimed is:
1. A digital display device including:
   a power source connected to drive the digital display device;
   a plurality of character-forming display segments;

a driver circuit connected to the plurality of display segments to selectively energize the plurality of display segments;

a failure detection circuit connected to the plurality of display segments to detect the failure of any of the plurality display segments to energize; and to generate a blanking signal indicative of display segment failure;

an override circuit to override the blanking signal;

wherein the driver circuit is connected to the failure detection circuit to receive the blanking signal such that the driver circuit de-energizes the plurality of display segments on receipt of the blanking signal; and wherein the override circuit is connected to the driver circuit such that the timer circuit overrides the blanking signal to permit energizing of the plurality of non-failed display segments by the driver circuit.

2. A digital display device as defined in claim 1 where: the means to override the blanking signal includes a timing means to determine the duration of the blanking signal.

3. A digital display device as defined in claim 2 wherein: the failure detection circuit includes a comparator having an input connected to the plurality of display segments and further having an output connected to the driver circuit such that the comparator output has a first value representing the absence of a failed display segment and has a second value representing the blanking signal.

4. A digital display device as defined in claim 3 wherein: the driver circuit is connected to each of the plurality of display segments via a plurality of resistors; and further wherein the comparator is connected to each of the plurality of display segments via a plurality of diodes at a junction between the plurality of resistors and the plurality of display segments.

5. A digital display device as defined in claim 4 wherein: the comparator output is connected to the driver circuit via a flip-flop which stores the blanking signal.

6. A digital display device as defined in claim 5 wherein: the failure detector circuit is manually operated.

7. A digital display device as defined in claim 6 wherein: the override circuit to override the blanking signal includes a circuit means connected to the flip-flop such that the circuit means clears the blanking signal from the flip-flop upon operation of the failure detection circuit.

* * * * *